United States Patent [19]

Carre et al.

[11] Patent Number: 5,624,775
[45] Date of Patent: *Apr. 29, 1997

[54] APPARATUS AND METHOD FOR PRINTING A COLOR FILTER

[75] Inventors: Alain R. E. Carre, Le Chatelet-eu-Brie; Bernard Eid, La Grande-Paroisse, both of France; Ronald E. Johnson, Tioga, Pa.

[73] Assignee: Corning Incorporated, Corning, N.Y.

[*] Notice: The portion of the term of this patent subsequent to Oct. 17, 2014, has been disclaimed.

[21] Appl. No.: 499,982

[22] Filed: Jul. 10, 1995

Related U.S. Application Data

[63] Continuation-in-part of Ser. No. 324,345, Oct. 17, 1994, Pat. No. 5,514,503, and a continuation-in-part of Ser. No. 197,141, Feb. 16, 1994, Pat. No. 5,544,582.

[51] Int. Cl.$^6$ ............... G03F 9/00; B41M 1/20; B41M 1/34
[52] U.S. Cl. ............... 430/7; 430/20; 430/321; 101/151; 101/170; 101/483; 101/491; 156/240; 156/277; 427/287; 427/511; 359/891
[58] Field of Search ............... 101/33, 34, 35, 101/36, 38.1, 41, 151, 163, 170, 175, 424.1, 483, 488, 491, DIG. 43; 156/235, 240, 277; 427/165, 287, 511; 430/7, 20, 321; 359/891

[56] References Cited

U.S. PATENT DOCUMENTS

| | | | |
|---|---|---|---|
| 4,035,214 | 7/1977 | Shuppert et al. | 156/240 |
| 4,549,928 | 10/1985 | Blanding et al. | 156/660 |
| 5,127,330 | 7/1992 | Okazaki et al. | 101/450 |
| 5,514,503 | 5/1996 | Evans et al. | 430/7 |
| 5,533,447 | 7/1996 | Johnson et al. | 101/211 |
| 5,535,673 | 7/1996 | Bocko et al. | 101/211 |
| 5,540,147 | 7/1996 | Johnson | 101/211 |
| 5,544,582 | 8/1996 | Bocko et al. | 101/211 |

FOREIGN PATENT DOCUMENTS

| | | | |
|---|---|---|---|
| 61-284441 | 12/1986 | Japan | B41F 7/08 |
| 5-147359 | 6/1993 | Japan | B41M 5/30 |

OTHER PUBLICATIONS

Katsuhiko Mizuno and Satoshi Okazaki, "Printing Color Filter for Active Matrix Liquid-Crystal Display Color Filter", Nov. 1991, pp. 3313–3317.

Primary Examiner—Mark F. Huff
Attorney, Agent, or Firm—Robert L. Carlson

[57] ABSTRACT

A method and apparatus for making color filters for liquid crystal display panels. A transfer layer is formed on a collector roll, and a raised pattern corresponding to the desired black matrix pattern is formed on the transfer layer by an embossing means. A plurality of colored ink patterns is formed in the appropriate location within the boundaries formed by the raised pattern, thereby forming the multicolor image that will become the color filter. This multicolored image is then transferred to the substrate. Preferably, the inks are deposited into the black matrix pattern using typographic imaging pins which are smaller than the cells of the black matrix pattern.

29 Claims, 5 Drawing Sheets

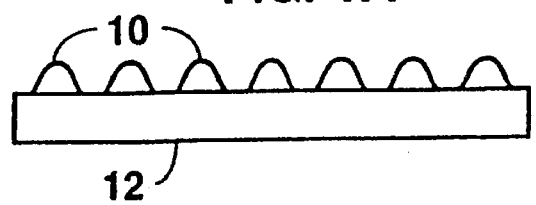
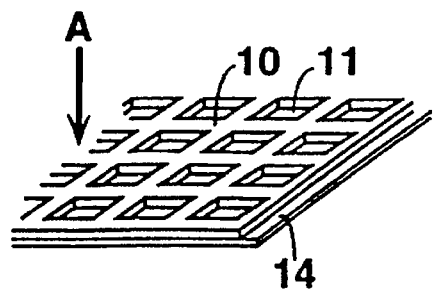
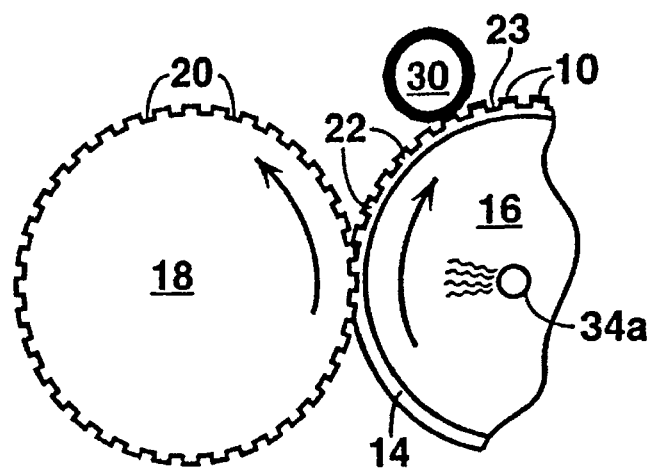
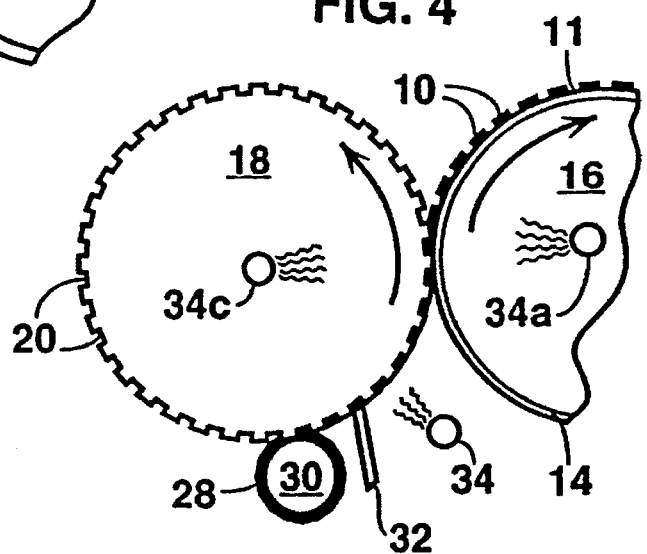
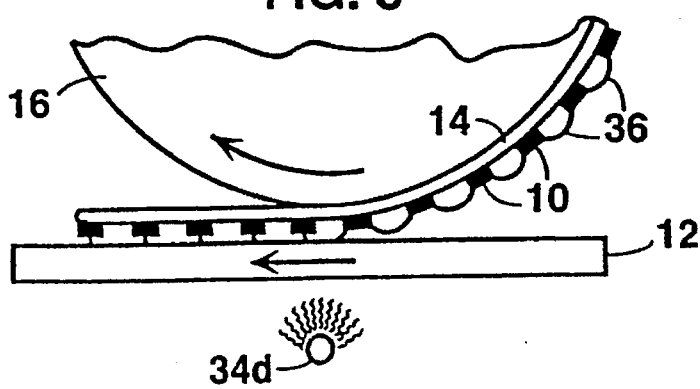

APPARATUS AND METHOD FOR PRINTING A COLOR FILTER

RELATED APPLICATIONS

This application is a Continuation-In-Part of U.S. patent application Ser. No. 08/324,345, filed Oct. 17, 1994, titled APPARATUS AND METHOD FOR PRINTING A COLOR FILTER, now U.S. Pat. No. 5,514,503, Ser. No. 08/197,141, filed Feb. 16, 1994, titled METHOD FOR PRINTING A COLOR FILTER, now U.S. Pat. No. 5,544,582.

FIELD OF THE INVENTION

The invention relates to color filters for liquid crystal display panels and methods for their production.

BACKGROUND OF THE INVENTION

Liquid crystal display panels (LCDS), particularly color LCD panels, are used for flat screen televisions, projection television systems and camcorder view finders, with many more applications anticipated in the future.

The fabrication of an active matrix liquid crystal display involves several steps. In one step, the front glass panel is prepared. This involves deposition of a color filter element onto a suitable substrate, such as glass. Color filter deposition typically involves depositing a black matrix pattern and three primary (typically either red, green and blue or yellow, magenta and cyan) color dot or color cell patterns within the spaces outlined by the black matrix. The printed lines which form the black matrix typically are about 15–25 microns wide and about 0.5 to 2 microns thick. The red, green, and blue color cells are typically on the order of about 70–100 microns in width by 200 to 300 microns in length. The color cells are typically printed in films less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyimide alignment layer over the color filter element. The transparent conducting layer is typically indium tin oxide (ITO), although other materials can also be utilized.

In a second step, a separate (rear) glass panel is used for the formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal panel.

One critical step in the manufacture of the color filter is the preparation of the black matrix pattern. The sharpness of edge definition of the black matrix is extremely important. Unlike the colored ink cells, any variation in the black matrix edge, due to printing flow and so forth, is readily discernable when inspecting the final product. The color pixel edge, on the other hand, is typically hidden by the black matrix pattern. Consequently, to a certain extent the black matrix hides variability in the color pixel edge, while there is nothing to hide variability in the black matrix.

The black matrix pattern moreover has a much more stringent registration requirement than the color dot patterns, because the black matrix pattern must be capable of being registered with the transistors that make up the thin film transistor, which is located on the other glass panel. On the other hand, the width of the black matrix pattern provides some leeway in registering the color pixels, because the transition area between individual color dots which make up the color pixels is hidden by the grids which make up the black matrix pattern.

One typical black matrix pattern design consists of elongated black line grids which criss-cross one another to form rectangular spaces within which the color cell pixel inks will be located. Such grid matrices also include smaller black rectangles located along the grid cell edges which correspond to the thin film transistor (TFT) location on the opposite glass panel in the liquid crystal display. Because of the stringent registration requirements, the black matrix is preferably formed so that, for a black matrix pattern having the typical rectangular sub-pixel grid pattern, when looking down at the color filter, only sharp, well defined edges are seen on the black matrix. The cross-sectional shape of the grids which make up such black matrix pattern should also be rectangular with square edges. The corners and intersections of grids in such black matrix patterns should be perpendicular, so that, when looking down at the color filter, only square edges can be seen. Unfortunately, while some printing techniques have successfully been employed to produce the color ink dots which make up the color pixels, the drive to achieve thinner (and thus higher resolution) black matrix lines has pushed the resolution capabilities of conventional printing techniques to their limit. It becomes extremely difficult to maintain the sharp definition using printing techniques as this resolution limit is approached. The biggest problems with such ink printing techniques is that the inks tend to exhibit rounded cross-sectional shapes due to surface tension in the inks, and the edges become irregular.

Consequently, black matrix patterns are typically prepared using photolithographic techniques, even where the remainder of the color filter pattern is produced using printing techniques. Photolithographic techniques involve a large number of production steps, and are much more complex than printing methods. In addition, photolithographic techniques are typically much more expensive than ink printing techniques.

Another critical step in color filter formation is the formation of the red, green and blue color dots (also referred to as color cells) of the color filter. Such color cells preferably should be deposited so that they are as smooth and uniform in thickness as possible. Previous methods used to print color filter patterns have resulted in color patterns having insufficient smoothness. This is largely because the ink depositing methods of the prior art resulted in ink cells which were rounded or triangular in cross section. Consequently, a planarizing layer is commonly applied over the color patterns to alleviate imperfections in coating smoothness or thickness uniformity due to the deposition process. The transparent planarizing layer also serves to protect against ion migration to and from the ITO layer and color pattern layer. The planarizing layer should be deposited to be as smooth and flat as possible.

To facilitate deposition of a flat planarizing layer, it is desirable that the color patterns be smooth, flat and substantially parallel to the undersurface of the glass substrate. Uniform thickness color patterns are desirable for obtaining optimum display contrast and color performance, because if the thickness of the pattern varies, the transmitted light intensity will vary.

One other problem with forming multicolored ink color filter patterns is preventing the different colored inks from mixing with one another. In the past, this problem has been solved by depositing the colors and drying them one at a time.

It would be desirable to provide high quality color filters, having uniform thickness black matrix patterns, as well as ink color filter arrays, which have improved resolution and registration, and which can be obtained easily and at a lower cost than prior art color filter arrays. It would also be desirable to achieve these qualities using a process which takes less steps than current processes.

SUMMARY OF THE INVENTION

The present invention relates to methods for forming a color filter for liquid crystal display applications. In the present invention, a raised pattern is formed, and the individual colored ink patterns that make up the color filter are then deposited within the recesses formed by the raised pattern. Preferably, the raised pattern is formed using mechanical forming techniques. By mechanical forming techniques, it is meant that the raised pattern is formed mechanically, such as by intaglio printing techniques, as opposed to photolithographic and other chemical forming techniques, wherein a portion of material is removed chemically after formation. The raised pattern preferably corresponds to a desired black matrix pattern. The ink is then deposited within the black matrix pattern utilizing typographic ink imaging pins, which preferably are smaller than the spaces formed by the black matrix, to facilitate deposition of the ink within the black matrix pattern without smearing the ink on the black matrix or mixing of the different ink colors.

In a preferred embodiment, a transfer layer is provided on a collector device, such as, for example, a collector roll or collector plate. A raised pattern, which preferably corresponds to the desired black matrix pattern, is then formed on the transfer layer. The individual red, green, and blue color cells are then deposited on the transfer layer, within the recesses formed by the raised pattern, to form a color filter pattern. After formation of the color pattern on the transfer layer, the entire composite of transfer layer and color filter pattern is transferred to the substrate so that the color filter pattern contacts the glass substrate. The transfer layer is thus on top, and acts as a planarizing and/or protective layer. The raised pattern on the transfer layer helps maintain separation of the color cells during and after the printing operation.

Preferably, the raised pattern on the transfer layer is provided in the form of a raised black matrix pattern. Such a raised black matrix pattern serves not only to help maintain separation of the color ink cells, but also to provide a high definition black matrix pattern. By raised black matrix pattern, it is meant that the upper surface of the black matrix pattern is above the upper surface of the transfer layer when the latter is on the collector surface.

In one embodiment of the present invention, prior to receiving the color cells which make up each pixel of the color filter, the transfer layer is contacted with a roll or plate having a recessed pattern thereon corresponding to the desired black matrix pattern. This results in the formation of a raised pattern on the transfer layer which corresponds to the desired black matrix pattern. If desired, black matrix ink may be applied to the top of the raised pattern to form the raised black matrix pattern.

In a preferred embodiment for forming a raised black matrix pattern, a black matrix ink pattern is formed within the recesses of an intaglio imaging surface, such as that provided by an imaging roll or plate having a recessed pattern thereon which corresponds to the desired black matrix pattern. The black matrix ink is preferably cured, or at least partially cured, prior to or during deposition to the transfer layer, to precisely duplicate the shape of the intaglio recessed pattern. Ink in intaglio and gravure print plates typically has a negative meniscus, the surface of the ink in the recessed intaglio pattern curving below the print plate surface. Consequently, the transfer layer is preferably liquid when it contacts the black matrix ink, so that it can contact and adhere to the black matrix ink. The liquid transfer layer is cured while in contact with the black matrix ink and thereby removes the ink from the recesses of the intaglio print pattern.

Ink printing methods are employed to deposit the red, green and blue color cells within the recesses formed by the raised pattern (which preferably is a raised black matrix pattern). Then, while the ink which makes up the color cells is still deformable, the resulting composite, consisting of the transfer layer, the color ink cells, and optionally the black matrix pattern, is transferred to the glass substrate. Regardless of whether the black matrix is on a transfer layer or a glass substrate, the black matrix pattern preferably is about 1 to 10 microns thick, more preferably about 2 to 6 microns thick, and most preferably about 3 to 4 microns thick (above the transfer layer or glass substrate ). After formation of a raised black matrix pattern, the colored ink which makes up the color filter pattern is then deposited within the cells formed by the black matrix pattern.

Preferably, the colored ink is deposited into the cells using ink imaging pins which have a smaller size than the cell size formed by the black matrix pattern. For example, in a cell having dimensions of approximately 50 by 175 microns, the typographic ink imaging pin should have a dimension in which the width is between 20 and 40 microns and the length is between 140 and 160 microns. More preferably, the pin size has a width between 25 and 35 microns and a length between 145 and 155 microns and most preferably, the pin has a width of about 30 microns and a length of about 150 microns. Thus, the width of the pin is preferably between 10–30 microns smaller than the black matrix cell width, more preferably 15–25 microns smaller than the cell width and most preferably about 20 microns smaller than the cell width, whereas the length of the pin should be between about 15–25 microns shorter than the cell length, more preferably about 20–30 microns shorter than the cell length, and most preferably about 25 microns shorter than the cell length. The height of the typographic pin is also important, and is closely related to the thickness of the ink on the inking roll which applies ink to the typographic pin. For example, in one process which utilizes typographic pins to deposit colored ink within black matrix cells having a dimension of about 50 by 175 microns, the inking thickness on the inking roll should be about 24 microns when using a pin approximately 30 microns wide by 150 microns long. Because it is desirable to have the typographic pin longer in height than the thickness of the ink on the inking roll, the height of the imaging pins in such embodiments should be at least 30 microns, and more preferably at least 35 microns, and most preferably about 40 microns in height. Because it is desirable to have the ink stick only to the top of the imaging pins, in the preferred embodiments of the present invention, the imaging pins are coated or otherwise consist of a low surface energy material on the sides of the imaging pins (lower than the surface energy of the top of the pins). In this way, the ink will wet only the top of the imaging pins, and the ink does not effectively wet the sides of the pins, to facilitate placement of the ink on the top of the pins only.

In one embodiment, the imaging pins are porous imaging pins, and the ink is forced through the porous imaging pins. The imaging plate or roll could, for example, comprise a reservoir for containing the pixel ink, and the pixel ink being selectively forced as desired through the imaging pins of the imaging plate to apply ink to the printing surface of the imaging pins.

The transfer layer may be formed using, for example, polyimides, epoxides, acrylics, vinyl ethers, polyurethanes, polyesters, and acrylated or methacrylated acrylics, esters, urethane, epoxides and other materials which are conventionally useful as planarizing layers in conventional color filter devices. A preferred material for the transfer layer is a radiation curable acrylate material, such as a radiation curable epoxy acrylate. Preferably, the transfer layer is formed of a radiation curable material so that it may be cured while receiving the ink pattern which makes up the black matrix pattern. The transfer layer is deposited onto a collector device as a thin film, typically less than 10 microns.

The methods of the present invention result in a number of advantages over prior art methods for forming black matrix patterns. First, it is now possible to produce extremely accurate black matrix patterns having well defined square edges. As a result, the definition of the black matrix patterns of the present invention is much improved over the prior art.

In addition, smaller typographic ink imaging pins than the cell dimension formed by the black matrix, the process of depositing the colored inks within the black matrix cell is greatly facilitated.

Also, because the transfer layer acts as an in-situ formed planarizing layer, no subsequent operation is needed to form a planarizing layer.

In addition, by formulating the ink used to form the red, green and blue color cells to be deformable during the deposition to the substrate, the compression provided by the transfer layer, which is in turn provided by the collector roll, deforms the colored ink cells to a more uniform shape. This more uniform dot shape is preferably retained, during the deposition operation, by curing the ink while under compression from the transfer operation. The transfer layer serves to protect and maintain this more uniform ink dot shape.

BRIEF DESCRIPTION OF THE DRAWINGS

FIG. 1A illustrates a cross-section of a black matrix pattern formed using ink printing methods of the prior art.

FIG. 1B illustrates a perspective view of a black matrix pattern formed on a transfer layer using the method of the present invention.

FIG. 3 illustrates an apparatus for forming a raised black matrix pattern in accordance with the present invention.

FIG. 4 illustrates an alternative apparatus for forming a raised black matrix pattern in accordance with the present invention.

FIG. 5 illustrates the deposition of a color filter pattern, formed in accordance with the present invention, to a glass substrate.

DETAILED DESCRIPTION OF THE INVENTION

In the present invention, a raised pattern is formed, and the individual colored ink patterns are then deposited within the recesses formed by the raised pattern to form a color filter pattern. Preferably, the raised pattern is formed using mechanical forming techniques. By mechanical forming techniques, it is meant that the raised pattern is formed mechanically, such as by intaglio printing techniques, as opposed to photolithographic and other chemical forming techniques, wherein a portion of material is removed chemically after formation. However, the invention is not limited to mechanical forming, and other techniques, including photolithography, could be utilized in some embodiments to make the black matrix patterns.

The raised pattern preferably corresponds to a desired black matrix pattern, and the individual colored ink patterns that make up the color filter are deposited within the black matrix pattern. Preferably, the ink is deposited within the black matrix pattern utilizing typographic ink imaging pins which are smaller than the spaces formed by the black matrix pattern. This facilitates deposition of the colored ink within the black matrix pattern without smearing or mixing of the different ink colors.

Figure 2A:
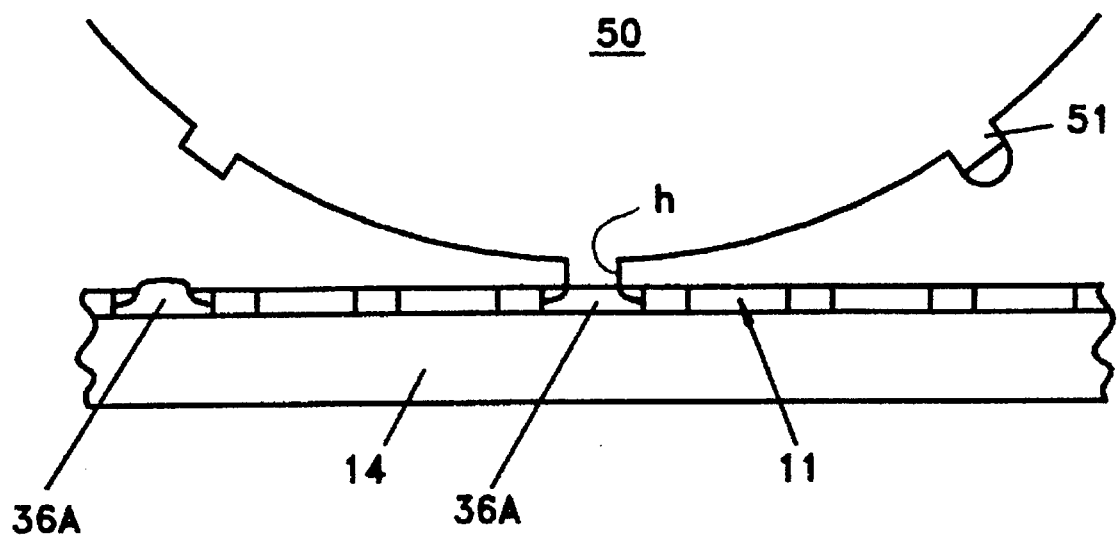
FIG. 2A illustrates the deposition of a colored ink into the recess of a black matrix pattern from an imaging roll in accordance with the invention.
Figure 2B:
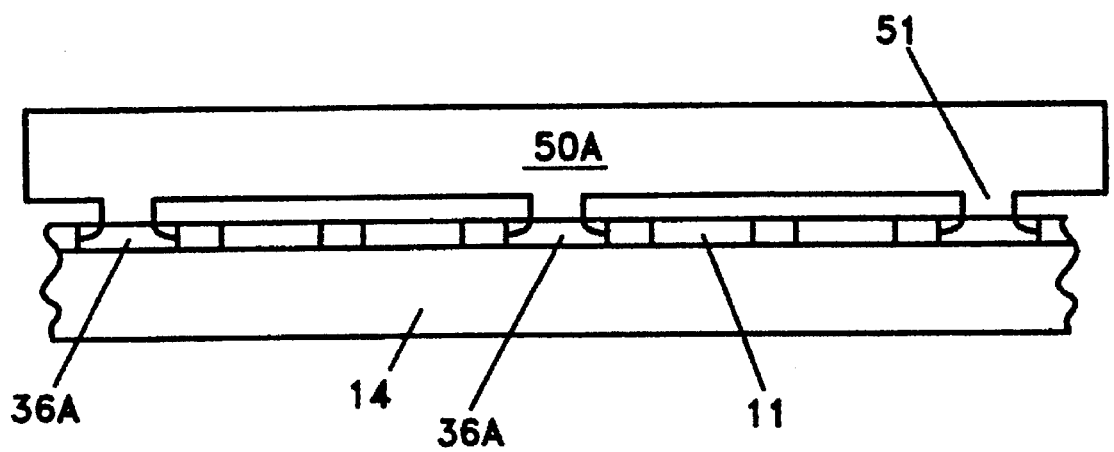
FIG. 2B illustrates the deposition of a colored ink into the recess of a black matrix pattern from an imaging plate in accordance with the invention.

In the present invention, a black matrix pattern such as the one illustrated in FIG. 1B is formed on a suitable substrate. Then, as illustrated in FIGS. 2A and 2B, the various colored ink patterns are deposited within the recesses 11 formed by black matrix pattern 10 using a typographic ink imaging pattern. The typographic ink imaging pattern can be supplied on a pattern roll 50 as illustrated in FIG. 2A or on a pattern plate 50A, as illustrated in FIG. 2B. In FIGS. 2A and 2B, pattern roll 50 and pattern plate 50A, respectively, comprise a plurality of typographic ink imaging pins 51. The imaging pins 51 carry the colored ink 36A and deposit the ink within the recesses 11 formed by black matrix pattern 10. As can be seen in the illustration, the ink is preferably still fluid after deposition and may extend somewhat above the surface of the black matrix pattern.

Figure 2C:
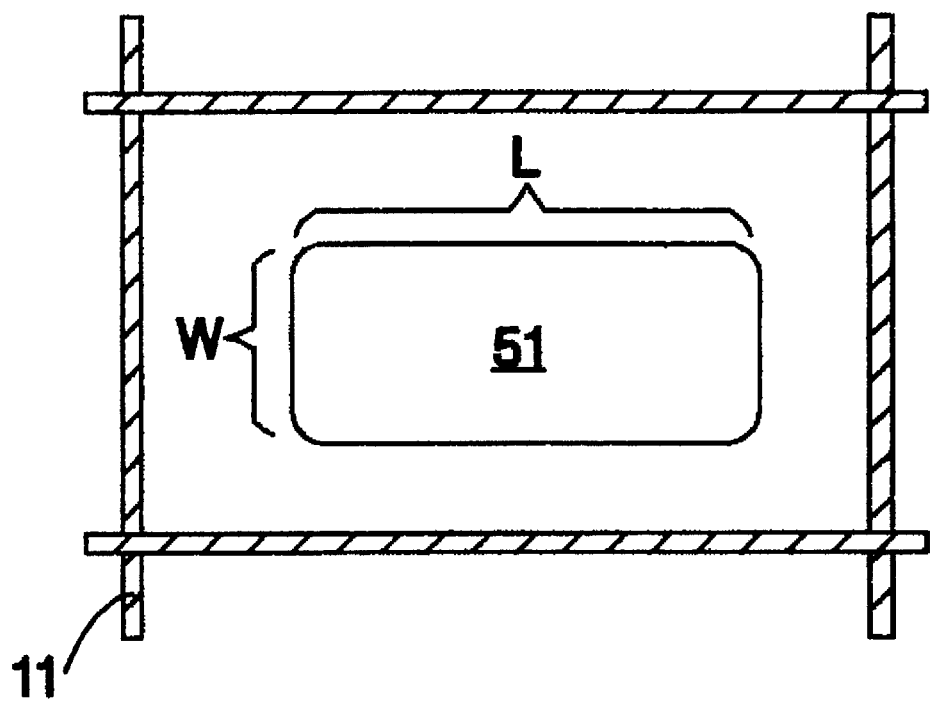
FIG. 2C is an enlarged partial top view of an imaging pin depositing ink into a black matrix pattern from an imaging roll or plate as illustrated in FIGS. 2A and 2B.

FIG. 2C illustrates a top view of the process illustrated in FIG. 2A, showing black matrix pattern 11 and typographic ink imaging pin 51 positioned within a cell formed by black matrix pattern 11 to deposit a color ink 36A therewithin.

The black matrix pattern preferably is about 1 to 10 microns thick, more preferably about 2 to 6 microns thick, and most preferably about 3 to 4 microns thick (above the transfer layer or glass substrate). After formation of a raised black matrix pattern, the colored ink which makes up the color filter pattern is then deposited within the cells formed by the black matrix pattern.

Preferably, the colored ink is deposited into the cells using ink imaging pins which have a smaller size than the cell size formed by the black matrix pattern. For example, in a cell having dimensions of approximately 50 by 175 microns, the typographic ink imaging pin should have a dimension in which the width W is between 20 and 40 microns and the length L is between 140 and 160 microns. More preferably, the pin size has a width between 25 and 35 microns and a length between 145 and 155 microns. Most preferably, the pin has a width of about 30 microns and a length of about 150 microns. Thus, the width W of the pin is preferably between 10–30 microns smaller than the black matrix cell width, more preferably 15–25 microns smaller than the cell width and most preferably about 20 microns smaller than the cell width, whereas the length L of the pin should be between about 15-25 microns shorter than the cell length, more preferably about 20-30 microns shorter than the cell length, and most preferably about 25 microns shorter than the cell length. The height of the typographic pin is also important, and is closely related to the thickness of the ink on the inking roll which applies ink to the typographic pin. For example, in one process which utilizes typographic pins to deposit colored ink within black matrix cells having a dimension of about 50 by 175 microns, the inking thickness on the inking roll should be about 24 microns when using a pin approximately 30 microns wide by 150 microns long. Because it is desirable to have the typographic pin longer in height than the thickness of the ink on the inking roll, the height h (as illustrated in FIG. 2A) of the imaging pins in such embodiments should be at least 30 microns, and more preferably at least 35 microns, and most preferably about 40 microns in height.

In one embodiment, the imaging pins are porous imaging pins, and the ink is forced through the porous imaging pins. The imaging plate or roll could, for example, comprise a reservoir for containing the pixel ink behind the porous imaging plate, and the pixel ink selectively forced through the porous imaging pins of the imaging plate to apply ink to the printing surface of the imaging pins. Such porous imaging pins are discussed further in U.S. patent application Ser. No. 08/491,425, filed Jun. 16, 1995, titled METHOD AND APPARATUS FOR MANUFACTURING COLOR FILTERS FOR FLAT PANEL DISPLAYS, the specification of which is hereby incorporated by reference.

In the preferred embodiment of the present invention, a transfer layer is deposited onto a collector device, such as a collector roll. The transfer layer is then embossed to form an upraised pattern on the transfer layer. This upraised pattern could be, for example, a raised black matrix pattern, or a raised pattern which corresponds to the desired black matrix pattern. The red, green and blue color dot patterns are deposited within the recesses formed by the raised pattern on the transfer layer, and the resultant composite, which consists of the transfer layer, a raised pattern (which may or may not be the black matrix pattern) and color cells is transferred in one step to the glass substrate.

The transfer layer provides a unique surface on which to form the black matrix pattern and each of the red, green and blue (or yellow, magenta, and cyan) color dot patterns. Forming the color filter pattern on a transfer layer enables the entire assembly, consisting of the transfer layer, black matrix pattern and color dot patterns, to be transferred to a substrate so that the color filter is sandwiched between the transfer layer and the substrate. Because the transfer layer acts as an in-situ formed planarizing layer, no subsequent operation is needed to a form a planarizing layer. Such transfer layers are further discussed in U.S. patent application Ser. No. 08/197,141, the specification of which is hereby incorporated by reference. The transfer layer may be formed using, for example, those materials selected from the group consisting of polyimides, epoxides, acrylics, vinyl ethers, polyurethanes, polyesters, and acrylated or methacrylated acrylics, esters, urethane, or epoxides, and other materials which are conventionally useful as planarizing layers in conventional color filter devices. A preferred material for the transfer layer is a radiation curable acrylate material, such as a radiation curable epoxy acrylate. The transfer layer is deposited onto a collector device as a thin film, typically less than 10 microns. Preferably, the transfer layer is formed of a radiation curable material to facilitate curing.

In FIG. 3, transfer layer 14 is applied to a collector roll, and then a raised pattern is formed on transfer layer 14. The raised pattern can be formed on transfer layer 14 using a variety of techniques. For example, in FIG. 3, transfer layer 14 is contacted by patterned intaglio roller 18 (with no ink thereon) while transfer layer 14 is in a deformable state. Patterned intaglio roller 18 has a recessed pattern 20 thereon corresponding to the desired black matrix pattern. As a result, patterned intaglio roller 18 (which could alternatively be an intaglio plate) contacts the deformable transfer layer 14 and forms raised pattern 22, which corresponds to the desired black matrix pattern 10. Transfer layer 14 will have to be hardened sufficiently to retain the embossing pattern obtained from roll 18. This can be accomplished by utilizing thermoplastic inks and cooling the transfer layer, at the point of contact with roll 18, to set the ink. Alternatively, and more preferably, radiation curable inks could be employed, and radiation emitted from ultraviolet light 34a through roll 16 to cure the transfer layer 14 during the embossing operation. Black matrix ink may then be applied to raised pattern 22 to form a raised black matrix pattern 10. In the embodiment illustrated in FIG. 3, black matrix ink 28 is applied from black matrix ink applicator roll 30 to upraised pattern 22 to form raised black matrix pattern 10.

Alternatively, the black matrix ink 28 can be applied at a different location in the process of manufacturing the liquid crystal display panel. For example, the black matrix ink can be applied on the other (TFT) glass substrate. If desired, the black matrix pattern can be deposited on top of the thin film transistor. For applications in which the black matrix pattern is deposited on the TFT substrate, it is felt that formation of the raised pattern 22 on transfer layer 14 is key, in order to separate and align the various red, green, and blue color cells with the black matrix pattern. By then registering the black matrix pattern 10 to align with raised pattern 22, when one looks down at the resultant liquid crystal display, the color cells will appear to be within the black matrix pattern.

The red, green, and blue color ink cells which make up the remainder of the color filter pattern are then deposited within the recesses 23 formed by raised pattern 22 on transfer layer 14. The entire composite, consisting of transfer layer 14, black matrix pattern 10, and the red, green, and blue color cells is then transferred, in a single deposition step, to a glass substrate.

FIG. 4 illustrates an alternative embodiment, in which transparent transfer layer 14 is provided on collector roll 16. Transfer layer 14 may be applied using ink-type applicating rollers or slot coating techniques. Black matrix ink is deposited into recessed pattern 20 of intaglio roller 18, then cured or otherwise hardened within recessed pattern 20, so that the shape of recessed pattern 20 is retained by the ink. The ink is then transferred to transfer layer 14. In a preferred embodiment, radiation curable ink is employed for the black matrix pattern, and the ink is hardened by curing the ink with radiation prior to or simultaneous with transfer to transfer layer 14. Transfer layer 14 is preferably liquid prior to contacting the black matrix pattern, and cured during the transfer of the black matrix pattern to transfer layer 14. Such curing may be accomplished by employing ultraviolet radiation curable material to form transfer layer 14, and applying radiation, via ultraviolet (UV) light 34a, for example, to transfer layer 14 during deposition of the black matrix pattern 10 to transfer layer 14. UV light 34a is mounted within roll 16, which is made of UV radiation transparent material to allow the radiation to be emitted therefrom. It should be noted that the radiation employed does not have to be ultraviolet, but could instead be visible, infrared, or other radiation, depending on the photoinitiator employed for the transfer layer.

Using the method illustrated in FIG. 4, much more uniform and accurate black matrix patterns can be produced than was previously thought possible. To illustrate, FIG. 1A illustrates a cross-sectional view of the grids that make up a typical black matrix pattern 10 deposited on a glass substrate 12 using prior art ink printing methods. In such prior art processes, the inks tended to deform to a rounded or triangular cross-sectional shape due to surface tension effects in the inks, as illustrated in FIG. 1A. These rounded or triangular shaped lines in some cases worsen with time, and fine lines begin to break into droplets which can further result in loss of definition. In some cases the lines can even become discontinuous due to dewetting of the inks on the transferring (offset) surface or glass substrate. In addition, because of surface tension effects, inks tend to migrate at the intersections of black matrix grid lines or wherever there is a change in pattern area. Moreover, the thickness and therefore the optical density of such black matrices tended to be non-uniform.

FIG. 1B illustrates a black matrix pattern 10 formed on a transfer layer 14 using the method illustrated in FIG. 4. The method of the present invention allows the black matrix ink to exactly duplicate and retain the shape of recessed pattern 20. Consequently, as illustrated in FIG. 4, the grids of this black matrix pattern have only square edges. Consequently, when a consumer looks at the finished black matrix patterns of the present invention (i.e., in the direction indicated by directional arrow A), he or she will see only well defined, ninety degree angles between grids if that is the chosen design, and uniform thickness grids having uniform optical density. As will be discussed further below, the color ink cells will be deposited within the recesses 11 formed by black matrix pattern 10.

The apparatus in FIG. 4 is similar to that illustrated in FIG. 3. However, intaglio roller 18 is now used as a black matrix ink patterning roll. The intaglio roller 18 in FIG. 4 has ink receiving recessed pattern 20 thereon, which receives radiation curable, thermal wax, or solvent based black matrix ink 28. In a preferred embodiment, ink applicating roller 30 applies radiation curable black matrix ink 28 into recessed pattern 20. Excess ink is removed from the pattern by doctor blade 32. The ink is then cured or set within recessed pattern 20, such as, for example, by exposure to ultraviolet radiation from UV lamp 34, thereby forming a black matrix pattern 10 which will at least substantially retain the shape of the recessed pattern 20. Alternatively, in a preferred embodiment, intaglio roll 18 is constructed of radiation transparent material, and a UV light 34c is mounted therein to cure or partially cure the black matrix ink while it is retained within recessed pattern 20. Such curing or setting of the black matrix ink could alternatively take place simultaneous with contact of the black matrix ink with the transfer layer. For example, the black matrix ink could be cured by radiation from UV light 34a. When the curing or hardening of the black matrix ink is accomplished, the black matrix is sufficiently hardened so that the ink at least substantially retains, and preferably completely retains, the exact shape of recessed pattern 20. Black matrix patterning roller 18 is then contacted with transfer layer 14 to transfer the cured or otherwise hardened black matrix pattern 10 from recessed pattern 20 on patterning roller 18 to transfer layer 14 on collector roll 16. This results in a black matrix pattern on transfer layer 14 which resembles that in FIG. 1B. The transfer layer is preferably smooth, and preferably liquid prior to receiving the black matrix ink. It is important that the intaglio imaging surface be more releasing than the collector surface. Ink in intaglio and gravure print plates typically have a negative meniscus, the surface of the ink in the recessed intaglio pattern curving below the print plate surface. Consequently, the transfer layer must be sufficiently soft and tacky to contact and adhere to the black matrix ink and remove the ink from the recesses of the intaglio print pattern.

Using the embodiment illustrated in FIG. 4, wherein the black matrix pattern is cured while in the recessed pattern of intaglio roller 18, the resolution of the black matrix pattern is dependant upon the depth and shape of recessed pattern 20 and how well this shape is imparted to the black matrix pattern 10. By setting or curing black matrix pattern 10 while it is still contained within recessed pattern 20, the black matrix pattern will necessarily acquire the square edges and corners of the recessed pattern. Thus, the processes of the present invention avoid the irregular, triangular or rounded corners and edges which are typical of conventional ink printing techniques.

It should be noted that the process illustrated in FIG. 4 can be in place of or in addition to the transfer layer shaping process illustrated in FIG. 3. Thus, if desired, a first roll 18 can be used to form a raised pattern on transfer layer 14, after which a second roll 18 can be used to deposit a cured, raised black matrix pattern on top of the raised pattern 22.

Completion of the color filter involves formation of the color pixels. Each color pixel typically consists of a red, green, and blue subpixel (subpixels are also herein referred to as color cells). In all of the above described embodiments, after the raised pattern 10 (or raised black matrix pattern 10) has been applied to transfer layer 14, the red, green and blue color cells of the color filter pattern are applied to transfer layer 14 within the recesses 11 formed by raised pattern 10. Preferably, the red, green and blue color cells are deposited within black matrix pattern 10 using typographic ink printing techniques. After deposition of the red, green and blue color ink cells within raised pattern 10, the entire composite, which consists of transfer layer 14, raised pattern 10, and red, green and blue color cells 36, is transferred to a glass substrate 12.

FIG. 5 illustrates the deposition of a black matrix pattern 10, color filter pattern 36, and transfer layer 14 to a glass substrate 12. The composite illustrated in FIG. 5 consists of black matrix pattern 10, which was formed using the method illustrated in FIG. 4, as well as color filter pattern 36. During deposition of the composite to the substrate, the ink cells 36 which comprise the red, green and blue color cells is preferably in a liquid or otherwise deformable state. Consequently, the ink cells are squeezed, during the deposition, between transfer layer 14 and glass substrate 12, and thereby deformed to a smoother, more uniform ink dot shape and thickness. This more uniform shape and thickness is retained, preferably by curing simultaneous to the transfer operation. Such curing can be accomplished via UV light 34d, which is positioned to emit radiation through the glass substrate. Preferably, during the deposition operation, the ink cells deform and completely fill the spaces formed by the grids of the black matrix pattern. Although the raised cell walls restrict the ink flow, in so deforming, the ink cells may still overflow the black matrix pattern 10 slightly. Such overflow is normally acceptable.

Figure 6:
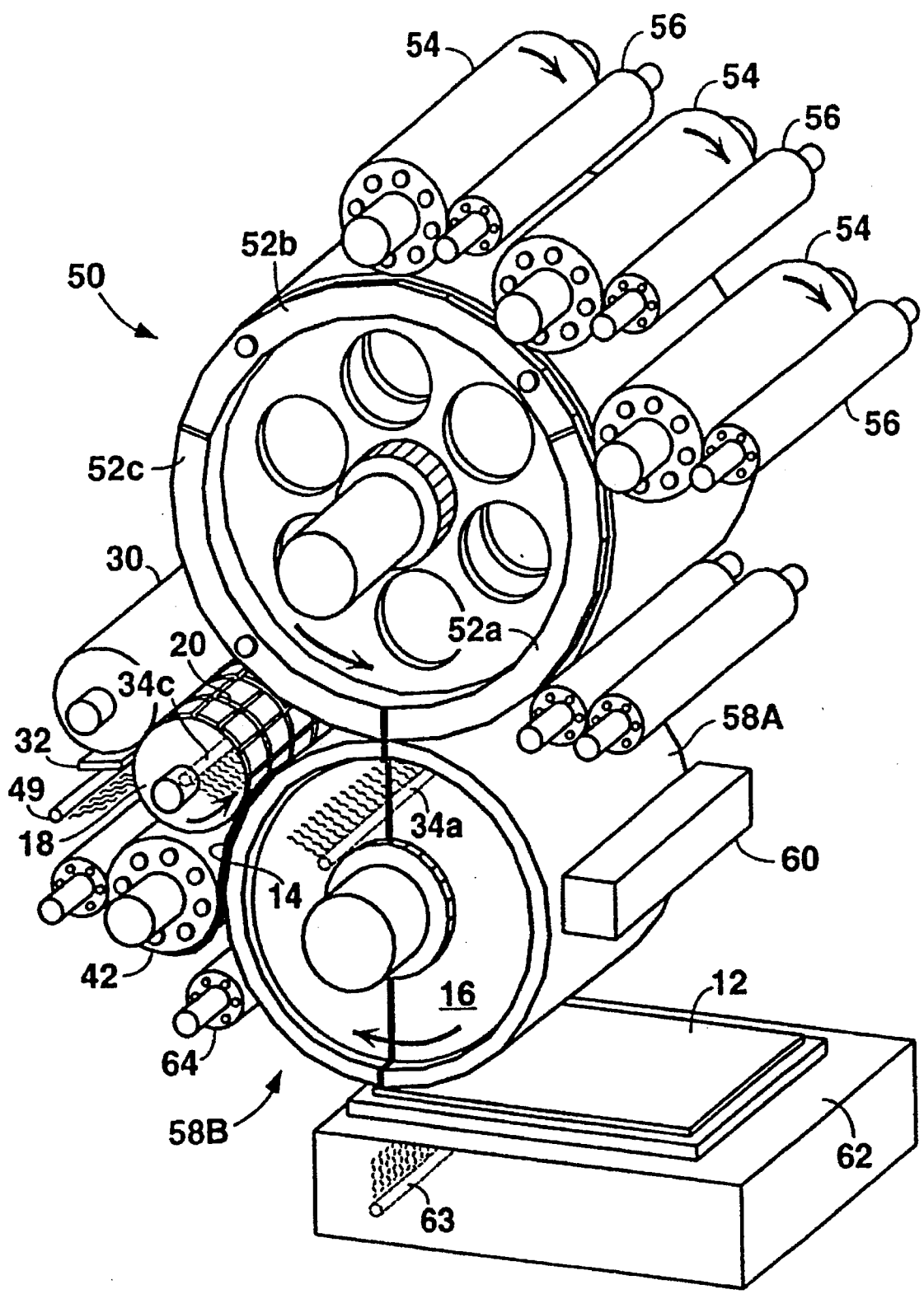
FIG. 6 illustrates a preferred printing apparatus for practicing the method of the present invention.

FIG. 6 illustrates a preferred apparatus for carrying out the method described above with respect to FIG. 4. The FIG. 6 apparatus includes transfer layer applicator roll 42, which applies a relatively uniform thickness transparent transfer layer 14 to collector roll 16 prior to receiving the multicolored ink pattern.

After the formation of transfer layer 14, a raised black matrix pattern is deposited from black matrix imaging roll 18 onto transfer layer 14. Black matrix imaging roll 18 has a recessed pattern 20 thereon corresponding to the desired black matrix pattern. Recessed pattern 20 receives black matrix ink from black matrix inking roll 30. Excess ink is removed from recessed pattern 20 by doctor blade 32, to provide a uniform thickness of ink within recessed pattern 20. The black matrix ink is then at least partially cured or set while still contained within recessed pattern 20 of black matrix imaging roll 18. This may be accomplished by curing black matrix pattern 10 either prior to or simultaneous to transfer to transfer layer 14. For example, in one embodiment, black matrix imaging roll 18 is formed from a radiation transparent material, and an ultra-violet light source 34c is provided within black matrix imaging roll 18 to emit ultra-violet radiation and thereby cure the black matrix pattern. Alternatively, as illustrated in FIG. 6, ultraviolet light source 49 may be positioned to emit ultra-violet radiation onto the black matrix pattern roll 18. After excess black matrix ink has been removed by doctor blade 32, ultra-violet light source 49 emits radiation on the ink and thereby cures black matrix ink pattern 10 while it is still retained within the recessed pattern of black matrix patterning roller 18. Alternatively, the ink may set by appropriate cooling of a thermal wax formulation, drying of a solvent based ink, or a combination of such curing mechanisms.

The cured black matrix pattern 10 is then transferred from black matrix imaging roll 20 to transfer layer 14. The transfer layer 14 is preferably liquid prior to the deposition of the black matrix pattern thereon to insure intimate contact with the recessed ink. If partially pre-cured the transfer layer should preferably be tacky or sticky enough to contact and remove the black matrix pattern from intaglio roller 18. While in contact with the black matrix pattern 10, the transfer layer 14 is preferably cured or otherwise hardened so that it is sufficiently solid to substantially retain its shape, and also so that it removes the black matrix pattern 10 from the roll 18. Such curing may be accomplished by designing collector roll 16 to be transparent and emitting radiation from ultraviolet light 34a located within collector roll 18. The radiation emitted from UV light 34a cures transfer layer 14. After the black matrix pattern has been formed on transfer layer 14, the red, green and blue color cell patterns which make up the remainder of the color filter pattern are deposited on transfer layer 14. The following is a description of how the red, green, and blue color cells are deposited within the recesses 11 formed by black matrix pattern 10 on transfer layer 14, all of which is supported by collector roll 16.

In the apparatus of FIG. 6, a single imaging pattern roll 50, having multiple printing patterns thereon, is utilized to apply the red, green and blue color dot patterns. Pattern roll 50 may be virtually any form of roll capable of producing an ink pattern or image, including lithographic, typographic, waterless lithographic, and so forth. Preferably, pattern roll 50 is a flexographic or other type of typographic printing roll. Alternatively, the color may be transferred from a typographic print plate rather than a roll.

In FIG. 6, pattern roll 50 is a typographic roll having three typographic patterned ink receiving regions 52a, 52b, and 52c, thereon which receive ink to form the blue, green and red color ink patterns, respectively. Inking rolls 54 apply the correct colored ink from ink metering rolls 56 to each of the three ink receiving regions 52a, 52b and 52 of pattern roll 50. The inking rolls 54 are movable to and from a contacting position with pattern roll 50, to enable each colored ink to be applied only to the appropriate ink receiving region.

Collector roll 16 has two receiving surfaces: 58a and 58b, each of which collects a full color filter pattern of black matrix and three pixel colors on the transfer layer. The separate colored ink patterns developed on ink receiving regions 52a, 52b and 52c of pattern roll 50 are printed onto receiving surfaces 58a and 58b of collector roll 16 in registration. This means that each separate colored ink pattern from region 52a, 52b and 52c prints its respective ink pattern on each of receiving surfaces 58a and 58b of collector roll 16 in a specific geometric relation with each of the other colored ink patterns, each ink color being deposited within its respective compartment within the black matrix pattern.

In FIG. 6, transfer layer applicator roll 42 is depositing a transfer layer 14 to receiving surface 58b of collector roll 16 and black matrix applicator roll 18 is depositing a cured raised black matrix pattern 10 on transfer layer 14. Next, red ink pattern region 52c will deposit the red color dot pattern onto receiving surface 58b of collector roll 16, and green ink pattern region 52b will deposit the green color dot pattern onto receiving surface 58a. On the next rotation of collector roll 16, blue ink pattern region 52A will deposit the blue color dot pattern onto receiving surface 58b, and red ink pattern region 52c will deposit a red ink pattern onto receiving surface 58a. On the next rotation of roll 16, green ink pattern region 52b will deposit a green color dot pattern onto receiving surface 58b, and blue ink pattern region 52a will deposit a blue color dot pattern onto receiving surface 58a. At this point, a complete color filter image will be present, with each of the colored inks deposited within the raised black matrix pattern, all of which are on transfer layer 14, which in turn is supported by receiving surface 58b of collector roll 16. The color filter image is inspected at inspection station 60, which may employ, for example, an image analysis or laser scanning type inspection system. If the multicolored pattern does not pass inspection, it is rejected and cleaned off of compartment 58b by cleaning roller 64. If the multicolored pattern passes inspection, glass substrate 12, which is supported on vacuum chuck 62, is contacted with collector roll 16 and the resultant composite, which consists of transfer layer 14, black matrix pattern 10, and the red, green, and blue color cells, is transferred to the substrate.

Transfer of the multicolored ink pattern preferably takes place while the multicolored image is still deformable. In this way, the inks are compressed, during the transfer, between transfer layer 14 and the substrate 12, as illustrated in FIG. 5. In a preferred embodiment, the ink employed for the color ink cells is radiation curable, vacuum chuck 62 is made of a transparent material, and an ultraviolet light 63 is provided within vacuum chuck 62 to emit radiation through substrate 12. The ink is cured while under compression from the transfer deposition operation, causing the ink cells to retain the more uniform shape created during the transfer operation.

Registration requirements for liquid crystal display color arrays is typically on the order of plus or minus 30 microns, with future requirements expected to be about plus or minus 5 microns. Because of these extremely demanding registration requirements, a printing machine like that shown in FIG. 6, which utilizes a single pattern roll 50 to form and deposit the various color patterns to a single collector roll 16, is very useful. First, because there are only two rolls involved, i.e., pattern roll 50 transferring to collector roll 16, there are less mechanical parts to align.

Registration is further facilitated by accurately locating the individual patterns 52a, 52b, and 52c on pattern roll 50 so that, when collector roll 16 and pattern roll 50 are accurately aligned, each pattern automatically registers itself when depositing its respective ink patterns to collector roll 16. Thus, there is only one pattern roll to align, as opposed to prior art methods, which used multiple pattern rolls. Once all of the colored inks have been deposited on transfer layer 14, the entire multicolored image is transferred from collector roll 16 to substrate 12 in a single transfer as illustrated in FIG. 5.

In addition, the embodiment illustrated in FIG. 6 employs an image transfer ratio, from pattern roll 50 to collector roll 16, of 3:2. Transfer ratio is the ratio of the number of multicolored patterns on pattern roll 50 to the number of receiving surfaces on collector roll 16. The 3:2 image pattern transfer ratio from pattern roll 50 to collector roll 16 is advantageous in that such a ratio results in the seriatim transfer of multiple images from one roll to another so that each ink region 52 visits a different receiving segment 58 on the collector roll with every rotation of collector roll 16. This results in a self-indexing process, i.e., once into a running production process, and a precise registration is achieved between all of the printing components, pattern roll 50 and collector roll 16 are maintained in their respective positions in a matched surface speed mode of operation. This self-indexing feature aids in maintaining accurate registration.

In addition, the multicolored ink pattern is transferred to substrate 12 in a single transfer step. In this way, there is only one registration, between the collector roll and substrate, needed for deposition of the multicolored ink pattern and black matrix to the substrate. This is unlike prior art methods which typically deposit the color filter pattern to the substrate in three different depositions, and therefore require three separate registrations with the substrate.

In a preferred apparatus for carrying out the methods of the present invention, the apparatus illustrated in FIG. 6 is mounted on its side (i.e., by vertically mounting the printing rolls). By vertically mounting the printing rolls, they may be removed vertically (in an axial direction, relative to the roll) from the printing apparatus, as opposed to conventional horizontally disposed rollers, which must be removed horizontally.

A number of disadvantages inherent in prior art printing device are overcome by supporting the print rolls of FIG. 6 on the end. First, if desired the printing rolls can be supported by a single bearing system located beneath each print roll, rather than two (one at each end). Because this leaves the opposite end (i.e., the upper end) of each print roll free, these print rolls can be removed and replaced by moving the rolls in a vertical direction. Consequently, changing print rolls is greatly facilitated.

For embodiments in which an ink (black matrix and/or color ink) is cured, the ink is preferably formulated to be radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent. In the embodiment illustrated in FIG. 6, vacuum chuck 62 is capable of transmitting radiation which is suitable for curing the particular ink employed. For example, vacuum chuck 62 could have an ultraviolet (160–400 µm) or visible (400–700 µm) radiation source therein, and thereby be capable of emitting ultraviolet or visible radiation. Alternatively, the ink can be exposed to the radiation by other methods, such as by aiming a radiation source at the nip formed by the roll and the substrate. While such curing may be done by radiation curing using conventional radiation emitting lamps, alternatively a laser could be used, guided by mirrors, to cure (crosslink) the ink sufficiently. In order for the dot to be cured in the deformed state by deposition to the substrate, the surface area of the contact area between the collector roll and the substrate must be large enough, for a particular roll rotation speed, to allow for an appropriate amount of curing while the dot is still being compressed in a flattened state. This contact area, called the "foot", is typically about a 5 to 25 mm wide contact area on the glass.

Color filters typically require approximately 15–25 micron width black matrix lines, and small color cells which are typically on the order of about 70–100 microns in width by 160 to 300 microns in length. The color cells are typically printed in films less than about 10 microns thick, and preferably less than 5 microns thick. These thin color cells must be evenly applied and accurately registered within the black matrix patterns. In carrying out the present invention, conventional radiation-curable inks are generally preferred over thermoplastic inks, partly because they can be printed at lower viscosities, which helps in printing such thin cells. Also, it is more difficult to control the pattern registration of hot melt thermoplastic inks, as they require extremely tight thermal tolerances to control pattern dimensions. In addition, radiation curable inks are easily cured during compression transfer operations in accordance with the invention. Thermoplastic inks do have at least one advantage, in that they can be formulated to set up immediately upon deposition to a substrate or transfer roll having a lower temperature, resulting in less pinholes, film non-uniformities and other such defects which can be caused by inadequate wetting of transfer surfaces. Consequently, another preferred type of ink is one that displays both thermoplastic and radiation curable properties. Such an ink is one which is formulated to be thermoplastic until printed to the substrate, at which point it can be cured by exposure to appropriate radiation. By cured, it is meant that the ink is to some extent cross-linked. Cross-linking of the ink increases its durability and resistance to higher temperatures, which is preferable due to the temperatures the color filter will be exposed to in subsequent processing steps. For the black matrix ink, another preferred type of ink is a solvent based formulation in which a volatile solvent is incorporated into the ink to lower the viscosity during inking and doctoring, the solvent being chosen so that it is compatible with the ink and readily evaporated from the thin (preferably 2 to 5 micron) black matrix pattern in the intaglio plate before contact with the transfer layer. The ink may then undergo crosslinking during subsequent radiation or thermal cure.

The inks may undergo final curing, during or after deposition to the substrate, by exposure to either radiation, thermal, moisture or other type of curing process, to achieve a hard, tack-free, durable state.

Although the invention has been described in detail for the purpose of illustration, it is understood that such detail is solely for that purpose and variations can be made therein by those skilled in the art without departing from the spirit and scope of the invention which is defined by the following claims.

For example, in the embodiments illustrated herein, transfer layer 14 is applied to a collector roll 16. However, the present invention is not limited to collector rolls, and thus other types of collector devices, such as plates, could also be utilized. Likewise, wherein some of the embodiments illustrated herein utilize pattern rollers, flat pattern plates could also be employed. In addition, an alternative to the process illustrated in FIG. 6 is to print the three sets of color cells directly on the collector roll 16, either from individual pattern rolls 54 or from flat imaging plates. In this alternative configuration, there would be no pattern roll 50.

Figure 7:
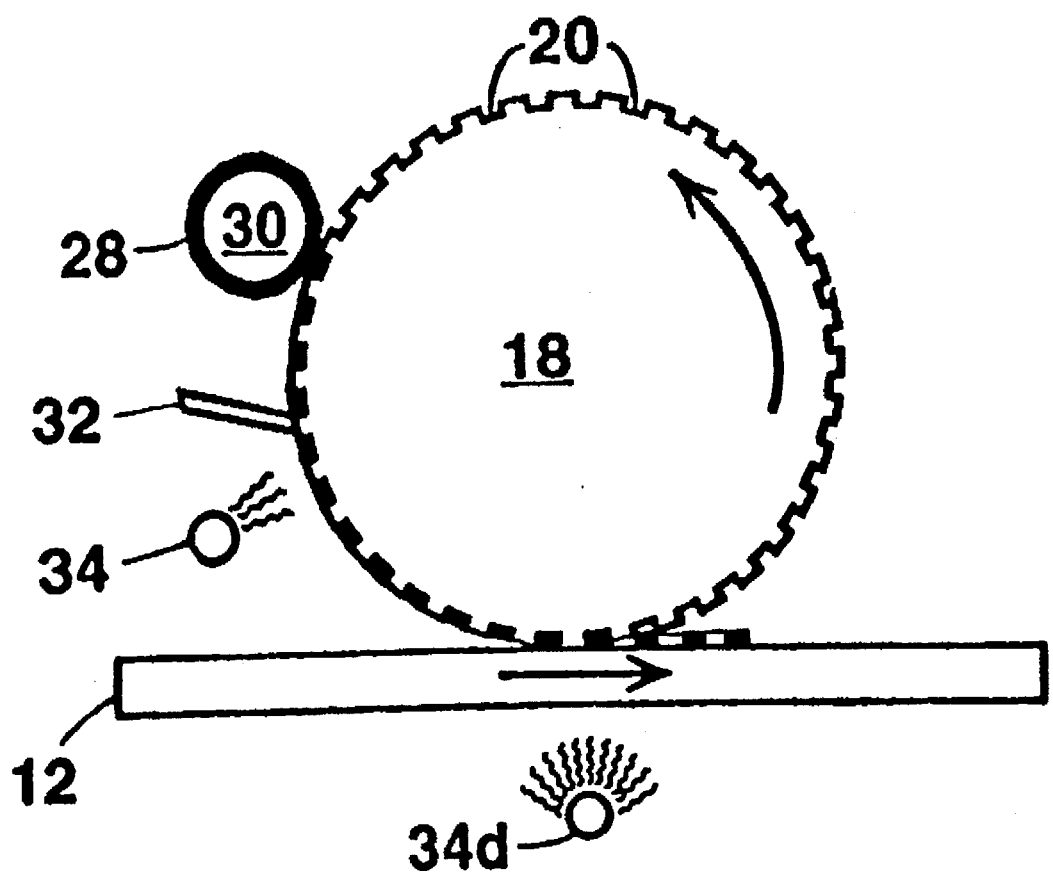
FIG. 7 illustrates an apparatus for depositing a raised black matrix pattern onto a glass substrate.

In addition, in most of the embodiments illustrated, the black matrix pattern is deposited onto a transfer layer, and then transferred, along with the color inks that make up the color filter, to the glass substrate. However, if desired, the black matrix pattern could be deposited directly onto the final substrate, which typically is glass, and the color filter pixel inks deposited into the black matrix pattern thereafter. For example, FIG. 7 illustrates deposition of an ink black matrix pattern onto a glass substrate. In FIG. 7, black matrix ink 28 is deposited into recessed pattern 20 of intaglio black matrix imaging roller 18, then cured or otherwise hardened within recessed pattern 20, so that the shape of recessed pattern 20 is retained by the ink. The ink is then transferred to the glass substrate 12. In a preferred embodiment, an adhesive layer is deposited onto the glass prior to receiving the black matrix pattern, and radiation curable ink is employed for the black matrix pattern. Suitable adhesive materials include those described above for transfer layer materials, or the unpigmented mediums (vehicles) employed in formulating sub-pixel inks. The ink may be hardened prior to deposition to the substrate by UV light 34. Alternatively, the ink may be cured simultaneous with transfer to glass 12 (by UV light 34d). The adhesive layer is preferably liquid prior to contacting the black matrix pattern, and is cured or hardened during or soon after (most preferably during) transfer of the black matrix pattern to the glass substrate 12. Such curing may be accomplished by employing ultraviolet radiation curable material to form the adhesive layer, and applying radiation, via ultraviolet (UV)light 34a, for example, to the adhesive layer during deposition of the black matrix pattern 10. The resultant black matrix pattern would be very similar in appearance to the black matrix pattern illustrated in FIG. 1B, with well defined edges, the exception being that a glass substrate would be substituted for transfer layer 14. Printing of the pixel inks can then be accomplished within the black matrix pattern using the methods described above, for example as illustrated in FIGS. 2A, 2B, and 2C.

What is claimed is:

1. A method for making a color filter comprising:
   mechanically forming a raised pattern having cell recesses on a substrate; and depositing a plurality of colored inks into said recesses to form said color filter.

2. The method of claim 1, wherein the cell recesses in said mechanically forming step have a width and a length.

3. The method of claim 2, wherein said depositing step comprises depositing said colored inks using typographic imaging pins having a smaller width and a smaller length than the width and length of said recesses.

4. The method of claim 3, wherein said depositing step comprises depositing said colored inks using typographic ink imaging pins having a width between 10–30 microns smaller than the cell recess width and a length between about 15–35 microns shorter than the cell recess length.

5. The method of claim 3, wherein said depositing step comprises depositing said colored inks using typographic ink imaging pins having a width between 15–25 microns smaller than the cell recess width, and a length between about 20–30 microns smaller than the cell recess length.

6. The method of claim 3, wherein said depositing step comprises depositing said colored inks using typographic ink imaging pins having a height which is at least 30 microns in height.

7. The method of claim 3, wherein said imaging pins are porous imaging pins, and the ink is forced through the porous imaging pins.

8. The method of claim 7, further comprising, prior to said depositing a plurality of inks step, applying a black matrix ink to said raised surface pattern, thereby forming a raised black matrix pattern on said transfer layer.

9. The method of claim 8, wherein said forming step comprises:
   depositing a black matrix ink within a recessed imaging pattern; and
   transferring said black matrix ink from said recessed imaging pattern to said transfer layer to form a raised black matrix pattern on said transfer layer.

10. The method of claim 9, comprising at least partially hardening said ink prior to said transferring said ink step, so that said ink substantially retains the shape of the recessed pattern after said transferring said ink step.

11. The method of claim 10, wherein said hardening step comprises curing said ink by exposure to ultraviolet radiation.

12. The method of claim 3, wherein each imaging pin comprises a top surface and at least one side surface, and said depositing step comprises depositing said colored inks using typographic imaging pins which comprise sides having a lower surface energy material than that of the top of said imaging pins.

13. The method of claim 1, wherein said forming step comprises printing said raised pattern onto a glass substrate.

14. The method of claim 13, wherein said printing step comprises:
   depositing black matrix ink into a recessed black matrix imaging pattern; and
   transferring said black matrix ink from said recessed imaging pattern to said substrate to form a raised black matrix pattern.

15. The method of claim 14, wherein said ink is at least partially cured prior to said transferring said ink step, and said ink substantially retains the shape of the recessed pattern after said transferring step.

16. The method of claim 14, wherein said black matrix ink is cured during said transferring step.

17. The method of claim 14, wherein prior to said transferring said pattern, an adhesive is applied to said glass.

18. The method of claim 3, wherein said forming step comprises forming a raised pattern on a transfer layer.

19. The method of claim 18, wherein said depositing step comprises depositing a plurality of colored ink patterns on said transfer layer, said ink patterns within said recessed surface pattern, to form a color filter pattern/transfer layer composite; and
   transferring said composite to a substrate so that the ink patterns contact the substrate.

20. The method of claim 19, wherein said forming step comprises contacting said transfer layer with an embossing means to form a raised surface pattern and a recessed surface pattern on said transfer layer, said raised surface pattern corresponding to a desired black matrix pattern.

21. The method of claim 20, wherein said embossing means comprises a pattern roll or a pattern plate.

22. The method of claim 21, further comprising curing said transfer layer during said contacting step.

23. A method for making a color filter, comprising:
   forming a raised pattern on a substrate, the cell recesses of said raised pattern having a width and a length; and
   depositing a plurality of colored inks into said recesses using typographic imaging pins having a smaller width and a smaller length than the width and length of said recesses, respectively, to form said color filter.

24. The method of claim 23, wherein said depositing step comprises depositing said colored inks using typographic ink imaging pins having a width between 10–30 microns smaller than the cell recess width and a length between about 15–35 microns shorter than the cell recess length.

25. The method of claim 23, wherein said depositing step comprises depositing said colored inks using typographic ink imaging pins having a width between 15–25 microns smaller than the cell recess width, and a length between about 20–30 microns smaller than the cell recess length.

26. The method of claim 23, wherein said depositing step comprises depositing said colored inks using typographic ink imaging pins having a height which is at least 30 microns in height.

27. The method of claim 23, wherein said imaging pins are porous imaging pins, and the ink is forced through the porous imaging pins.

28. A method of making a color filter, comprising:

forming a raised pattern on a substrate, said raised pattern defining a recessed pattern on said substrate; and depositing a plurality of colors into said recessed pattern using ink imaging pins having a top surface and at least one side surface, said top surface having a lower surface energy than said at least one side surface.

29. A method of making a color filter, comprising:

forming a raised pattern on a substrate, said raised pattern defining a recessed pattern on said substrate; and depositing a plurality of colors into said recessed pattern using ink imaging pins having a top surface which is ink wetting and at least one side surface, and said at least one side surface is ink non-wetting.

* * * * *